(12) United States Patent
Cherepinsky

(10) Patent No.: US 8,694,182 B2
(45) Date of Patent: Apr. 8, 2014

(54) ALTITUDE AND ACCELERATION COMMAND ALTITUDE HOLD ALGORITHM FOR ROTORCRAFT WITH LARGE CENTER OF GRAVITY RANGE

(75) Inventor: Igor Cherepinsky, Sandy Hook, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1432 days.

(21) Appl. No.: 11/695,707

(22) Filed: Apr. 3, 2007

(65) Prior Publication Data

US 2008/0249672 A1 Oct. 9, 2008

(51) Int. Cl.
*G05D 1/00* (2006.01)
*G05D 1/08* (2006.01)
*G05D 3/00* (2006.01)
*G06F 7/00* (2006.01)
*G06F 17/00* (2006.01)

(52) U.S. Cl.
USPC .................................... 701/7; 701/4

(58) Field of Classification Search
USPC ............... 701/3, 4, 7, 220; 244/17.11, 17.13, 244/76 R, 177, 178, 223; 318/628
See application file for complete search history.

(56) References Cited

U.S. PATENT DOCUMENTS

| | | | |
|---|---|---|---|
| 4,078,749 A * | 3/1978 | Johnson, Jr. | 244/178 |
| 5,001,646 A | 3/1991 | Caldwell | |
| 5,169,090 A | 12/1992 | Wright et al. | |
| 5,195,039 A * | 3/1993 | Gold et al. | 701/7 |
| 5,195,700 A * | 3/1993 | Fogler et al. | 244/17.21 |
| 5,465,212 A * | 11/1995 | Fowler et al. | 701/15 |
| 5,553,812 A | 9/1996 | Gold et al. | |
| 6,128,554 A | 10/2000 | Damotte | |
| 6,145,428 A | 11/2000 | Gold et al. | |
| 6,189,836 B1 | 2/2001 | Gold | |
| 6,477,448 B1 | 11/2002 | Maruyama | |
| 6,591,169 B2 | 7/2003 | Jones et al. | |
| 6,629,298 B1 | 9/2003 | Camporese et al. | |
| 6,648,269 B2 | 11/2003 | Gold et al. | |
| 6,679,458 B2 | 1/2004 | Einthoven et al. | |
| 6,711,476 B2 | 3/2004 | Jones et al. | |
| 6,814,330 B2 | 11/2004 | Jones et al. | |
| 2005/0004721 A1* | 1/2005 | Einthoven et al. | 701/4 |

FOREIGN PATENT DOCUMENTS

WO 2007018572 2/2007

OTHER PUBLICATIONS

PCT International Search Report and written opinion mailed Aug. 18, 2008.
Supplementary European Search Report dated Jan. 9, 2013 for European Application No. 08744833.8.

* cited by examiner

*Primary Examiner* — Jack W. Keith
*Assistant Examiner* — Imran Mustafa
(74) *Attorney, Agent, or Firm* — Carlson, Gaskey & Olds, P.C.

(57) ABSTRACT

A flight control system includes an Acceleration and Attitude Command/Velocity Hold mode (AACVH) algorithm which blends attitude commands with acceleration commands. This blending determines a trim attitude for a given rotorcraft flight condition.

8 Claims, 3 Drawing Sheets

ALTITUDE AND ACCELERATION COMMAND ALTITUDE HOLD ALGORITHM FOR ROTORCRAFT WITH LARGE CENTER OF GRAVITY RANGE

This invention was made with government support under Contract No.: W58RGZ-06-D-0045 awarded by the Department of the Army. The government therefore has certain rights in this invention.

BACKGROUND OF THE INVENTION

The present invention relates to flight control systems for rotary-wing rotorcraft and more particularly to a flight control system which provides a low pilot-workload trim attitude control.

Demand for low pilot-workload helicopters continues to increase. With the establishment of ADS-33 as the dominant handling qualities specification, the rotorcraft industry has been pursuing various methods to provide advanced flight control features. One primary method of compliance with ADS-33 is employment of a Fly-By-Wire (FBW) flight control system to decouple pilot inputs and rotorcraft dynamics.

Conventional FBW systems have implemented an Attitude Command/Velocity Hold (ACVH) response type in which rotorcraft attitude is directly proportional to the cyclic controller displacement from center. ACVH mode is required by the ADS-33 specification to provide reduced pilot workload especially in a degraded visual environment (DVE). Once the cyclic controller is returned to a neutral position (center detent for unique trim cyclic), the flight control system acquires a new velocity reference and engages the velocity hold part of ACVH.

One difficulty associated with ACVH presents itself in determining what attitude should be attained when the controller is returned to the neutral position. Since the velocity hold feature of ACVH is activated when the controller is returned to neutral position, it is desirable to have the rotorcraft return to the natural "trim" attitude. The difficulty appears when determining this "trim" attitude, since rotorcraft center of gravity (CG) has a direct impact on the "trim" attitude for a given flight condition.

In the past, ACVH has only been successfully implemented on relatively small scout/attack type rotorcraft which have a narrow CG range. Because of this narrow CG range, computing trim attitude for a given flight condition was implemented through a simple look-up table that provides trim attitude as a function of airspeed. Attempts to implement ACVH on larger transport/utility category rotorcraft, such estimation of the trim attitude, is impossible due to the large range of usable rotorcraft CG. In hover, for example, trim attitude may vary from 3 degrees nose up to 9 degrees nose up, depending on the current rotorcraft cargo load, fuel load and stabilator position.

Use of a look-up table that provides a "nominal" estimate also does not correct this difficulty as carrying any attitude error when the pilot is attempting to bring the rotorcraft into a hover may result in undesirable velocity transients. As the pilot stabilizes the rotorcraft in or near hover, the cyclic controller typically remains outside of detent due to the trim attitude estimation error from the "nominal" attitude. As the pilot releases the cyclic controller to detent, the rotorcraft attitude then changes by a few degrees—since any motion of the cyclic controller is interpreted by the flight control system as an attitude command—and the rotorcraft inevitably accelerates. After a few seconds, the velocity hold feature activates and the rotorcraft recovers hover, however, pilots have deemed this behavior unacceptable.

Accordingly, it is desirable to provide an algorithm for a flight control system that meets the ADS-33 specification to determine what attitude should be attained when a cyclic controller is returned to the neutral position for a rotorcraft with a large range of usable rotorcraft CG without airspeed specific look-up tables, or other estimation devices to provide reduced pilot workload.

SUMMARY OF THE INVENTION

The flight control system according to the present invention includes an Attitude and Acceleration Command/Velocity Hold (AACVH) algorithm which blends attitude commands with acceleration commands. This blending solves the problem of finding the "nominal" trim attitude for any given flight condition and rotorcraft CG. The addition of an acceleration command to the ACVH mode (making it AACVH) finds the trim attitude for a given condition to control rotorcraft velocity with high precision.

As the pilot stabilizes in or near hover, the cyclic controller will return to detent at zero acceleration, since both acceleration and attitude are controlled at the same time. As the flight conditions change, acceleration is the primary means of establishing trim attitude, so no airspeed specific look-up tables, or other estimation devices are required. From a failure tolerance standpoint, use of acceleration does not degrade system availability/reliability, since most modern Attitude and Heading Reference Systems (AHRS) use a combination of accelerometers and angular rate sensors to compute attitude, therefore accelerometers have the same level of criticality and redundancy as rate sensors.

The acceleration and attitude command is blended together such that for the short term (15-30 seconds) the pilot receives a pure Attitude Command response in which rotorcraft attitude change is proportional to the cyclic controller displacement. After this time window, the AACVH algorithm estimates acceleration that the rotorcraft should attain and engages an acceleration control loop to maintain this acceleration. Rotorcraft trim attitude (attitude where all rotorcraft states are not changing, i.e. attitude, acceleration and rate are constant) therefore changes. As the AACVH algorithm closes the acceleration control loop, the problem of trim estimation is avoided, since rotorcraft attitude and acceleration are related. The acceleration command part of the response type results in zero acceleration when the cyclic controller is returned to the neutral position.

The present invention therefore provides an Attitude and Acceleration Command/Velocity Hold mode (AACVH) algorithm for a flight control system that meets the ADS-33 specification to determine what attitude should be attained when a cyclic controller is returned to the neutral position for an rotorcraft with a large range of usable rotorcraft CG without airspeed specific look-up tables, or other estimation devices to provide reduced pilot workload.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
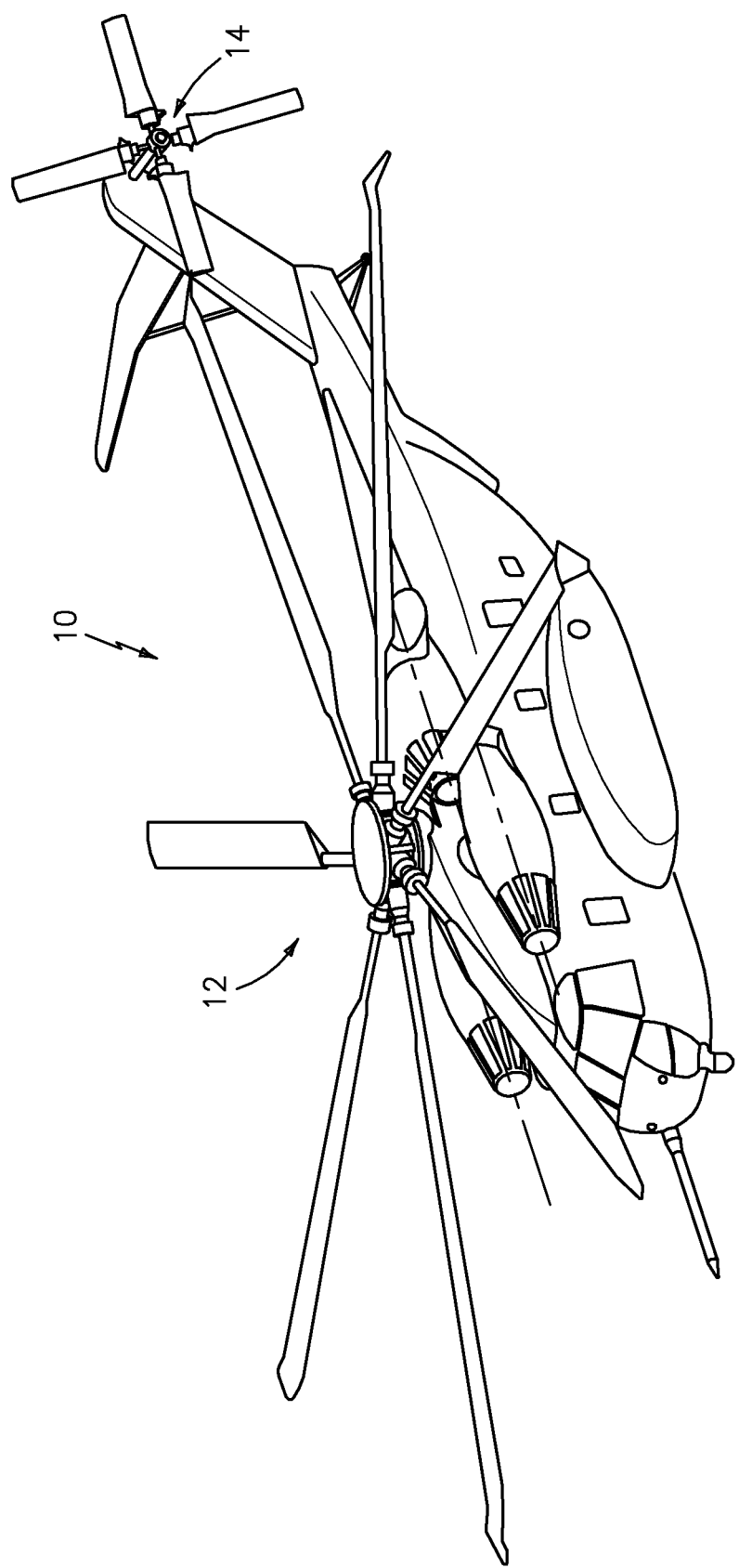
FIG. 1 is a general perspective view an exemplary rotary wing rotorcraft embodiment for use with the present invention.

FIG. 1 illustrates a general perspective view of a helicopter embodiment 10 of a rotary wing rotorcraft for use with the present invention. The helicopter includes a main rotor assembly 12 and tail rotor assembly 14. Although a particular helicopter configuration is illustrated and described in the disclosed embodiment, other configurations and/or machines, such as high speed compound rotary wing rotorcraft with supplemental translational thrust systems, dual contra-rotating, coaxial rotor system rotorcraft, turbo-props, tilt-rotors and tilt-wing rotorcraft, will also benefit from the present invention.

Figure 2:
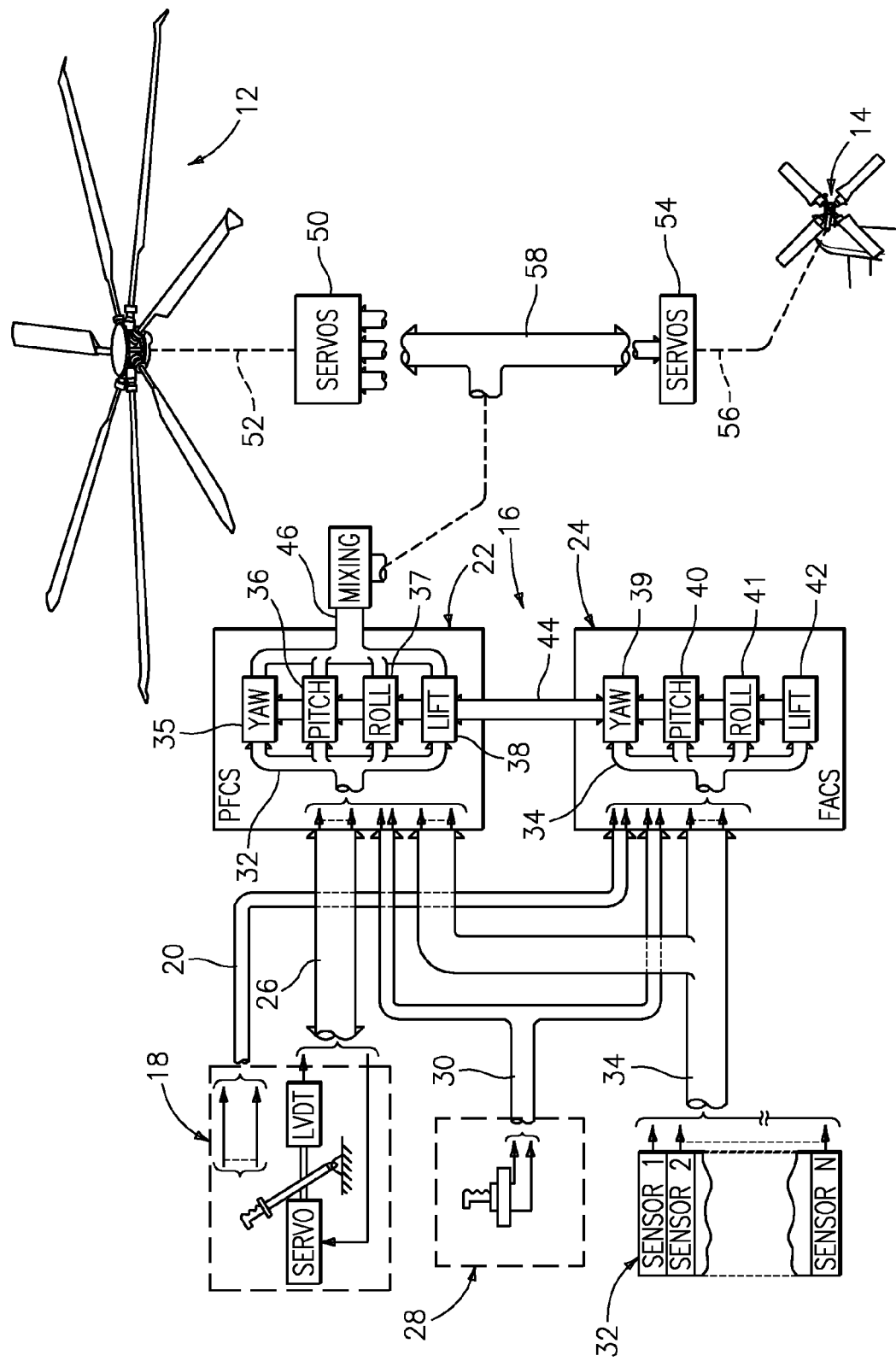
FIG. 2 is a block diagram of a flight control system for use with the present invention.

Referring to FIG. 2, the flight control system 16 includes a model following control system which shapes the pilot's controller and displacement commands through an inverse vehicle model to produce the desired rotorcraft response. The system includes a Primary Flight Control System (PFCS) 22 and a Flight Augmentation and Cueing System (FACS) 24. The PFCS and FACS each receive the force output command signals of a collective controller 18 on line 20, a cyclic controller 28 on lines 30, and the rotorcraft's sensed parameter signals from sensors 32, on lines 34. The collective control 18 and the cyclic control 28 may take various forms including sidearm controllers or other such control controllers. The pilot command signals on lines 20, 26, 30 and the sensed parameter signals on lines 34 are shown consolidated within trunk lines 32 and 34 in the PFCS and FACS, respectively.

It should be understood that the reference herein to the term trunk lines is a figurative term for the collective signal pathways between the various elements of the system 16. As known to those skilled in the art, while the individual signal paths may be conductive wires which are bundled in trunks for purposes of utility and/or protection (the trunk lines may be shielded against both mechanical and electromagnetic interference), the trunks may equally well be digital signal busses.

The PFCS and FACS each contain separate control channel logic for controlling the yaw, pitch, roll and lift axes of the rotorcraft. The logic is included in the PFCS and FACS control modules (schematically represented by blocks 35-38 for the PFCS and blocks 39-42 for the FACS). The sensed parameter signals from rotorcraft sensors 32, on lines 34, provide the PFCS and FACS with the rotorcraft's angular rate and attitude response to the rotor command signals. The PFCS logic provides rotor command signals and the FACS logic provides conditioning and/or trimming of the PFCS four axis logic functions. The PFCS and FACS logic modules interconnect through bus 44 to provide rotor command signals on output lines 46 to a mixing function 48 which communicates commands on lines 58 for the displacement of servos 50 and linkages 52 to control the tip path plane of the main rotor 12. A mixed command signal is also provided on line 58 to the helicopter's tail rotor servos 54 which control the thrust of the tail rotor 14 through linkages 56.

Figure 3:
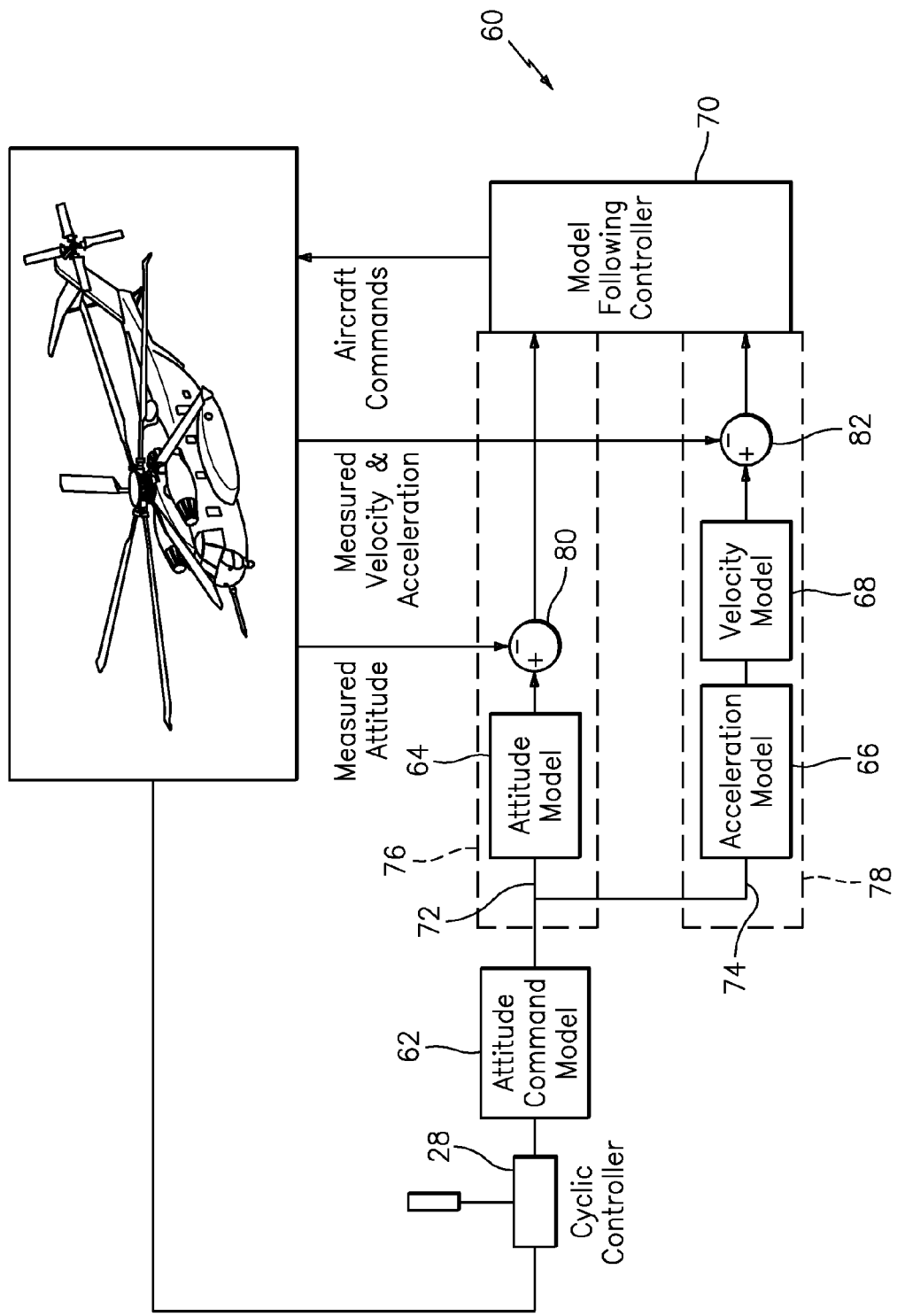
FIG. 3 is a block diagram of one embodiment of an Attitude and Acceleration Command/Velocity Hold mode (AACVH) algorithm for use with a FBW flight control system.

Referring to FIG. 3, an Attitude and Acceleration Command/Velocity Hold (AACVH) algorithm 60 of the flight control system 16 is illustrated in a block diagrammatic view. This AACVH 60 is fully compliant with the ADS-33 ACVH requirement; however the AACVH algorithm 60 blends an attitude command with an acceleration command. This blending solves the problem of finding trim attitude for any given flight condition. The trim attitude for an air vehicle is defined as an attitude where first derivatives of the primary states (velocity and attitude) are zero. In an Attitude Command/Velocity Hold (ACVH) mode attitude is held constant so as long as all accelerations are held to zero when the cyclic controller is in a neutral position. That is, the rotorcraft will be at the "trim" attitude. In ACVH mode, acceleration and attitude are proportional to the cyclic stick displacement. The addition of an acceleration command to the ACVH mode (making it AACVH) is the subject of this invention.

The AACVH algorithm 60 finds the trim attitude for a given flight condition to control rotorcraft velocity and thus attitude with high precision. To control velocity of the rotorcraft, acceleration of the rotorcraft must be controlled. Due to the underlying physics of the rotorcraft, change of attitude results in a proportional acceleration, so in order to control rotorcraft acceleration, the pilot must control rotorcraft attitude. This is why ADS-33 requires Attitude Command as part of ACVH. Once the pilot attains the desired velocity, the task of holding velocity is relegated to the flight control system, hence, the Velocity Hold portion ACVH.

The flight control system 16 utilizes model-following architecture to implement the AACVH algorithm 60. The AACVH algorithm 60 may be microprocessor based with a central processing unit, memory (RAM and/or ROM), with associated input and output buses, and/or may be a portion of a central vehicle main control system, an interactive vehicle dynamics module, or stand-alone controllers. Control algorithms are the scheme by which the decisions are made.

The AACVH algorithm 60 includes attitude command model logic 62, attitude model logic 64, acceleration model logic 66 and velocity model logic 68 which provide inputs to the model following controller 70. The attitude command model logic 62, receives command inputs from the cyclic controller 28. The cyclic controller 28 includes tactile cues such as a centering detent or the like which provide tactile feedback to the pilot. Tactile feedback generally includes varying controller gradients, gates, detents, soft stops and the like.

The output from the attitude command model logic 62 are input to both the attitude model logic 64, acceleration model logic 66 on lines 72, 74 respectively. That is, the output from the attitude command model logic 62 of the AACVH algorithm 60 blends an attitude path 76 with an acceleration path 78 for input to the model following controller 70 in a generally parallel manner. The output from the attitude model logic 64 is compared with the measured rotorcraft attitude at junction 80. The output from the acceleration model logic 66 is input to the velocity model logic 68 which is then compared to the measured rotorcraft velocity and acceleration at junction 82. The outputs from junction 80, 82 are then input into the model following controller 70 which outputs rotorcraft commands.

The AACVH algorithm 60 blends the acceleration and attitude commands together at the model following controller 70 for output as rotorcraft commands. For a short term (15-30 seconds), the pilot receives a pure Attitude Command response as in ACVH in which rotorcraft attitude change is proportional to cyclic controller 28 displacement. After this time window, the AACVH algorithm 60 estimates acceleration that the rotorcraft should attain and engages the acceleration path 78 control loop to maintain this acceleration.

As the pilot stabilizes in hover, the cyclic controller 28 will end in detent at zero acceleration, since both acceleration and attitude are controlled at the same time. As the flight conditions change, acceleration is the primary method of establishing trim attitude, so no airspeed specific look-up tables, or other estimation devices are required. From the failure tolerance standpoint, use of acceleration does not degrade system availability/reliability, since typical AHRS utilize a combination of accelerometers and angular rate sensors to compute attitude, therefore accelerometers have the same level of criticality and redundancy as rate sensors.

One operational case in point begins with the rotorcraft traveling in forward flight at 100 kts. At 100 kts trim is generally, for example, nose level or about 0 degrees pitch attitude which locates the cyclic controller in detent. To slow down, aft cyclic control is commanded by the pilot which, for example, is approximately 1.5 inches out of detent and proportional to 7 degrees nose up collective position and power need not be addressed in this example as such commands are generally conventional.

As the rotorcraft slows down, the rotorcraft approaches hover which, in this example, will be 5 degrees nose up pitch attitude. That is, the rotorcraft is slowing at 7 degrees nose up and the cyclic stick is 1.5 inches out of detent. Since steady state hover is 5 degrees nose up, back pressure on the cyclic stick is released to obtain the hover attitude of 5 degrees nose up. That is, back pressure is released from the 7 degrees nose up attitude to the 5 degrees nose up attitude. However, the cyclic controller is still out of detent to maintain hover at 5 degrees nose up. So, in the conventional ACVH mode the rotorcraft is hovering but the cyclic controller is short of detent—back pressure must still be held on the cyclic controller and velocity hold will not engage since the cyclic controller is not in detent. To engage velocity hold, back pressure is released such that the cyclic controller 28 moves to detent. This produces a forward cyclic command and the rotorcraft returns to nose level for a short period of time and starts to accelerate a bit—sort of a bubble—until the velocity hold actuates to return the nose back up to 5 degrees nose up to hold steady hover.

This "bubble" is minimized or eliminated by the AACVH algorithm 60 because with the AACVH algorithm 60 when the cyclic controller is being held out of detent, the AACVH algorithm 60 not only holds attitude (5 degrees nose up in this example) the AACVH algorithm 60 also holds constant acceleration (zero in this example since the rotorcraft is in hover). So as the AACVH algorithm 60 holds constant deceleration, the AACVH algorithm 60 is actually varying rotorcraft attitude in the long term but not the short term. That is, short term (15-30 seconds) the rotorcraft is required to hold attitude, but long term (greater than the short term) the AACVH algorithm 60 is adjusting rotorcraft attitude to be at the same deceleration level so that as the rotorcraft approaches hover, the cyclic controller is returned to detent and the rotorcraft is at the proper attitude to hold hover. Essentially, the AACVH algorithm 60 always requires the cyclic controller to be returned to detent to achieve hover.

Applicant has determined through piloted simulations that the present invention provides a significant increase in handling qualities, reduction in pilot workload and an increase in situation awareness. The AACVH algorithm 60 is applicable to all rotorcraft, but is of particular benefit to transport/utility category rotorcraft where CG variation are relatively large. As described above, unlike prior ACVH implementations, no estimation devices are required. Using only rotorcraft states in feedforward/feedback provides a robust system. Use of the AACVH algorithm 60 is compliant with ADS-33, with the additional benefits of further reducing pilot workload during brown-out approaches, ground proximity cueing, slung load operations and other tasks where precise velocity control is required.

When combined with a vertical speed command/altitude hold mode on the vertical axis AACVH facilitates workload reduction in Degraded Visual Environment and brown-out mitigation. For further understanding of the vertical speed command/altitude hold mode on the vertical axis and associated components thereof, attention is directed to U.S. patent application Ser. No. 11/687,739, entitled VERTICAL SPEED AND FLIGHT PATH COMMAND ALGORITHM FOR DISPLACEMENT COLLECTIVE UTILIZING TACTILE CUEING AND TACTILE FEEDBACK which was filed on Mar. 19, 2007 and is assigned to the assignee of the instant invention and which is hereby incorporated herein in its entirety.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A flight control system for a rotary wing rotorcraft comprising:
   a cyclic controller; and
   a microprocessor with an attitude model, an acceleration model and an Attitude and Acceleration Command/Velocity Hold (AACVH) algorithm, said microprocessor in communication with said cyclic controller, said AACVH algorithm operable to blend an attitude command from said attitude model with an acceleration command from said acceleration model to determine a trim attitude for a given rotorcraft hover flight condition such that said collective cyclic controller returns must be returned to a neutral position to achieve said hover flight condition, said neutral position is a center detent position for said cyclic controller;
   wherein said AACVH algorithm holds constant attitude and holds constant acceleration in response to said cyclic controller being held out of said center detent position.

2. The system as recited in claim 1, wherein said trim attitude is defined as an attitude where first derivatives of a primary velocity state and a primary attitude state are zero.

3. The system as recited in claim 1, further comprising a sensor system which senses measured rotorcraft attitude and a measured rotorcraft velocity and acceleration in communication with said Attitude and Acceleration Command/Velocity Hold microprocessor for use by said AACVH algorithm.

4. The system as recited in claim 1, wherein said Attitude and Acceleration Command/Velocity Hold AACVH algorithm generates an output to a model following controller.

5. The system as recited in claim 1, wherein said neutral position equates to said trim attitude for the rotorcraft.

6. The system as recited in claim 1, wherein said AACVH algorithm varies rotorcraft attitude over a long term but not over a short term.

7. The system as recited in claim 6, wherein said AACVH algorithm requires the rotorcraft to hold attitude over said short term but adjusts said rotorcraft attitude over the long term to be at a deceleration level so that as the rotorcraft approaches said hover flight condition such that said cyclic controller is returned to said center detent position with the rotorcraft at a proper attitude to hold said hover flight condition.

8. The system as recited in claim 7, wherein said short term is between 15-30 seconds.

* * * * *